(12) United States Patent
Ruscher et al.

(10) Patent No.: US 12,093,075 B2
(45) Date of Patent: Sep. 17, 2024

(54) MAGNETIC ATTACHMENT SYSTEM FOR INPUT DEVICE

(71) Applicant: Apple Inc., Cupertino, CA (US)

(72) Inventors: Joel N. Ruscher, Fremont, CA (US); Guangtao Zhang, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/940,930

(22) Filed: Sep. 8, 2022

(65) Prior Publication Data

US 2024/0085947 A1 Mar. 14, 2024

(51) Int. Cl.
*G06F 1/16* (2006.01)

(52) U.S. Cl.
CPC ................... *G06F 1/1607* (2013.01)

(58) Field of Classification Search
CPC .... G06F 1/1607; G06F 1/1656; G06F 1/1684; G06F 1/169; G06F 2200/1632
See application file for complete search history.

(56) References Cited

U.S. PATENT DOCUMENTS

| | | | |
|---|---|---|---|
| D296,440 S * | 6/1988 | Smith | D14/432 |
| 4,865,285 A * | 9/1989 | Gaggianese | B43M 99/004 |
| | | | 211/DIG. 1 |
| 6,149,116 A * | 11/2000 | Won | B60R 11/0241 |
| | | | 379/446 |
| 6,888,940 B1 * | 5/2005 | Deppen | B60R 11/0241 |
| | | | 379/454 |
| 7,374,142 B2 * | 5/2008 | Carnevali | F16M 13/00 |
| | | | 224/183 |
| 7,775,567 B2 * | 8/2010 | Ligtenberg | E05C 19/16 |
| | | | 292/DIG. 37 |
| 7,852,621 B2 * | 12/2010 | Lin | G06F 1/1616 |
| | | | 361/679.02 |
| 8,073,324 B2 | 12/2011 | Tsai | |
| 8,558,411 B2 | 10/2013 | Baarman et al. | |
| 8,688,037 B2 | 4/2014 | Chatterjee et al. | |

(Continued)

FOREIGN PATENT DOCUMENTS

| | | |
|---|---|---|
| CN | 101771283 | 7/2010 |
| CN | 101771283 A | 7/2010 |

(Continued)

*Primary Examiner* — Adrian S Wilson
(74) *Attorney, Agent, or Firm* — Brownstein Hyatt Farber Schreck, LLP

(57) ABSTRACT

A tablet computing system may include a display, and an enclosure enclosing the display. An exterior surface of the enclosure may define a stylus charging region, a stylus attachment region, and an interior surface opposite the exterior surface. The tablet computing system may further include a magnetic attachment mechanism positioned along the interior surface opposite the stylus attachment region and configured to releasably couple a stylus to the tablet computing system. The magnetic attachment mechanism may include a frame structure, and a magnet positioned in a recess of the frame structure and configured to move from a rest position in the frame structure to an attachment position proximate the interior surface of the housing member in response to the stylus being positioned on the stylus attachment region of the exterior surface of the housing member.

20 Claims, 12 Drawing Sheets

(56) References Cited

U.S. PATENT DOCUMENTS

| | | | |
|---|---|---|---|
| 8,902,574 B2 * | 12/2014 | Su | G06F 1/1656 361/801 |
| 8,907,752 B2 | 12/2014 | Wodrich et al. | |
| 8,912,686 B2 | 12/2014 | Stoner, Jr. et al. | |
| 9,025,318 B2 * | 5/2015 | Ashcraft | G06F 1/26 361/679.01 |
| 9,038,971 B1 | 5/2015 | Guthrie | |
| 9,063,693 B2 * | 6/2015 | Raken | G06F 1/1656 |
| 9,106,083 B2 | 8/2015 | Partovi | |
| 9,112,364 B2 | 8/2015 | Partovi | |
| 9,158,384 B2 * | 10/2015 | Whitt, III | G06F 3/002 |
| 9,277,661 B2 * | 3/2016 | Andre | H05K 5/0221 |
| 9,413,191 B2 | 8/2016 | Kim et al. | |
| 9,575,579 B2 * | 2/2017 | Ashcraft | G06F 3/0393 |
| 9,627,130 B2 | 4/2017 | Golko et al. | |
| 9,778,700 B2 * | 10/2017 | Zaloom | G06F 3/0393 |
| 10,153,666 B2 | 12/2018 | Lee et al. | |
| 10,243,402 B2 | 3/2019 | Park et al. | |
| 10,273,942 B2 | 4/2019 | Nakamura | |
| 10,404,089 B2 | 9/2019 | Kasar et al. | |
| 10,418,839 B2 | 9/2019 | Miller et al. | |
| 10,491,041 B2 | 11/2019 | Wittenberg et al. | |
| 10,615,552 B2 | 4/2020 | Miller | |
| 10,649,548 B2 * | 5/2020 | Pirie | G06F 3/03545 |
| 10,703,297 B1 | 7/2020 | Cohen et al. | |
| 11,031,164 B2 * | 6/2021 | Marshall | G06F 1/266 |
| 11,342,800 B2 | 5/2022 | Oro et al. | |
| 11,733,741 B2 * | 8/2023 | Sung | H04M 1/0274 361/679.56 |
| 2008/0297328 A1 * | 12/2008 | Crawford | A63F 13/285 340/407.2 |
| 2009/0212637 A1 | 8/2009 | Baarman et al. | |
| 2009/0278642 A1 | 11/2009 | Fullerton et al. | |
| 2010/0081377 A1 | 4/2010 | Chatterjee et al. | |
| 2010/0164431 A1 | 7/2010 | Sip et al. | |
| 2010/0219217 A1 * | 9/2010 | Andochick | A45F 5/02 224/250 |
| 2010/0252337 A1 * | 10/2010 | Yang | G06F 3/03545 178/19.01 |
| 2011/0310065 A1 * | 12/2011 | Liang | G06F 1/1626 345/179 |
| 2012/0068942 A1 | 3/2012 | Lauder et al. | |
| 2012/0112553 A1 | 5/2012 | Stoner, Jr. et al. | |
| 2012/0146576 A1 | 6/2012 | Partovi | |
| 2012/0306440 A1 | 12/2012 | Yeh | |
| 2013/0021729 A1 * | 1/2013 | Su | G06F 1/1698 361/679.01 |
| 2013/0099730 A1 | 4/2013 | Yoon | |
| 2013/0113423 A1 | 5/2013 | Baarman et al. | |
| 2013/0187596 A1 | 7/2013 | Eastlack | |
| 2013/0260677 A1 | 10/2013 | Partovi | |
| 2013/0300352 A1 | 11/2013 | Kuk et al. | |
| 2013/0307470 A1 * | 11/2013 | Watanabe | H02J 7/0044 320/108 |
| 2014/0029182 A1 * | 1/2014 | Ashcraft | G06F 3/03545 361/679.4 |
| 2014/0049894 A1 * | 2/2014 | Rihn | G06F 1/1616 335/219 |
| 2014/0242429 A1 | 8/2014 | Lee et al. | |
| 2014/0354218 A1 * | 12/2014 | Kaynar | H01F 7/0252 320/107 |
| 2015/0130412 A1 | 5/2015 | Partovi | |
| 2016/0040825 A1 * | 2/2016 | Franklin | F16M 13/02 439/39 |
| 2016/0094076 A1 | 3/2016 | Kasar et al. | |
| 2016/0105047 A1 | 4/2016 | Cui | |
| 2016/0128210 A1 | 5/2016 | Lee | |
| 2016/0206065 A1 | 7/2016 | Ehrlich | |
| 2017/0005399 A1 | 1/2017 | Ito et al. | |
| 2017/0070076 A1 | 3/2017 | Karanikos et al. | |
| 2017/0245040 A1 | 8/2017 | Hankey et al. | |
| 2018/0039343 A1 | 2/2018 | Park | |
| 2018/0069358 A1 | 3/2018 | Miller et al. | |
| 2018/0175668 A1 | 6/2018 | Hidaka et al. | |
| 2018/0248406 A1 | 8/2018 | Bae et al. | |
| 2018/0301936 A1 | 10/2018 | Lee et al. | |
| 2019/0089188 A1 | 3/2019 | Chien et al. | |
| 2019/0198212 A1 | 6/2019 | Levy | |
| 2019/0363565 A1 | 11/2019 | Graham et al. | |
| 2020/0346006 A1 | 11/2020 | Eigentler et al. | |
| 2021/0099026 A1 | 4/2021 | Larsson et al. | |
| 2021/0099027 A1 | 4/2021 | Larsson et al. | |
| 2021/0373615 A1 * | 12/2021 | Sung | G06F 3/03545 |
| 2022/0014655 A1 | 1/2022 | Hu et al. | |
| 2022/0147100 A1 * | 5/2022 | Kashyap | H10N 30/50 |
| 2023/0067384 A1 * | 3/2023 | Thome | G06F 1/1643 |

FOREIGN PATENT DOCUMENTS

| | | |
|---|---|---|
| CN | 102893495 A | 1/2013 |
| CN | 103748765 | 4/2014 |
| CN | 103748765 A | 4/2014 |
| CN | 104467129 A | 3/2015 |
| CN | 105305525 A | 2/2016 |
| CN | 205670700 U | 11/2016 |
| CN | 106877429 A | 6/2017 |
| CN | 207442540 U | 6/2018 |
| CN | 207475658 | 6/2018 |
| CN | 207475658 U | 6/2018 |
| CN | 208581077 U | 3/2019 |
| CN | 110855016 A | 2/2020 |
| EP | 0823717 A2 | 2/1998 |
| JP | 2013120837 A | 6/2013 |
| JP | 3197750 U | 6/2015 |
| JP | 2015171166 A | 9/2015 |
| JP | 6233504 B2 | 11/2017 |
| TW | M414057 U | 11/2011 |
| TW | 201347349 A | 11/2013 |
| TW | 201711335 A | 3/2017 |
| WO | WO 2010129369 A2 | 11/2010 |
| WO | WO 2011156768 A2 | 12/2011 |
| WO | WO 2016053633 A1 | 4/2016 |

* cited by examiner

MAGNETIC ATTACHMENT SYSTEM FOR INPUT DEVICE

FIELD

The subject matter of this disclosure relates generally to electronic devices, and more particularly, to magnetic attachment systems for attaching accessories to electronic devices.

BACKGROUND

Modern consumer electronic devices take many shapes and forms, and have numerous uses and functions. Tablet computing systems, for example, may include touch-sensitive displays, speakers, cameras, microphones, and batteries, as well as sophisticated processors and other electronics. These and other subsystems may be integrated into compact, handheld products that provide myriad functions while being reliable and capable of withstanding daily use.

SUMMARY

A tablet computing system may include a display and an enclosure enclosing the display. The enclosure may include a cover positioned over the display and defining a front exterior surface of the enclosure, and a housing member coupled to the cover. The housing member may define an exterior surface defining a stylus charging region and a stylus attachment region, and an interior surface opposite the exterior surface. The tablet computing system may further include a magnetic attachment mechanism positioned along the interior surface opposite the stylus attachment region and configured to releasably couple a stylus to the tablet computing system. The magnetic attachment mechanism may include a frame structure and a magnet positioned in a recess of the frame structure and configured to move from a rest position in the frame structure to an attachment position proximate the interior surface of the housing member in response to the stylus being positioned on the stylus attachment region of the exterior surface of the housing member, and move from the attachment position to the rest position in response to the stylus being removed from the stylus attachment region.

The magnetic attachment mechanism may further include a magnetic return component configured to attract the magnet to the rest position. A magnetic attraction between the magnet and a magnetic component in the stylus when the magnet is in the rest position may be greater than a magnetic attraction between the magnet and the magnetic return component when the magnet is in the rest position. The magnet may include an array of permanent magnets.

The magnet may be moved from the rest position to the attachment position due to magnetic attraction between the magnet and a magnetic component in the stylus. The magnet may be moved from the attachment position to the rest position due to magnetic attraction between the magnet and a magnetic return component coupled to the frame structure. The magnet may be a first array of permanent magnets, the magnetic component in the stylus may be a second array of permanent magnets, and the magnetic return component may be a ferromagnetic material.

The exterior surface may define an additional stylus attachment region and the tablet computing system may further include an additional magnetic attachment mechanism positioned along the interior surface opposite the additional stylus attachment region, the magnetic attachment mechanism comprising an additional frame structure and an additional magnet positioned in a recess of the additional frame structure. The additional magnet may be configured to move from an additional rest position in the additional frame structure to an additional attachment position proximate the interior surface of the housing member in response to the stylus being positioned on the additional stylus attachment region of the exterior surface of the housing member, and move from the additional attachment position to the additional rest position in response to the stylus being removed from the additional stylus attachment region. The stylus charging region may be positioned between the stylus attachment region and the additional stylus attachment region.

A portable electronic device may include an enclosure including a front cover defining a front exterior surface of the enclosure and a housing member coupled to the front cover and comprising a wall defining an exterior surface of the housing member. The portable electronic device may further include a magnetic attachment mechanism positioned along an interior surface of the wall opposite the exterior surface and configured to magnetically retain a stylus to the exterior surface, the magnetic attachment mechanism comprising a movable magnet configured to be magnetically retained, via magnetic attraction to a magnetic component in the stylus, in an attachment position when the stylus is positioned on the exterior surface, and magnetically retained in a rest position different from the attachment position when the stylus is removed from the exterior surface, wherein the rest position is a greater distance away from the interior surface of the housing member than the attachment position. The portable electronic device may further include a wireless charging system positioned along the interior surface of the housing member opposite the exterior surface and configured to wirelessly charge the stylus when the stylus is magnetically retained to the exterior surface.

The magnetic attachment mechanism may include a frame structure defining a recess, and the movable magnet may be positioned in the recess and is configured to move within the recess. The magnetic attachment mechanism may include a magnetic return component coupled to the frame structure, and the movable magnet may be magnetically retained in the rest position due to magnetic attraction between the movable magnet and the magnetic return component. The movable magnet may be configured to slide along a surface of the recess when moving between the rest position and the attachment position. The surface of the recess may include a coating. A distance between the attachment position and the rest position may be between about 0.25 mm and about 0.75 mm.

A portable electronic device may include a display, wireless communication circuitry, a battery, and an enclosure enclosing the display, the wireless communication circuitry, and the battery. The enclosure may define, along an accessory attachment surface of an exterior surface of the enclosure, an accessory charging region and an accessory attachment region. The portable electronic device may further include a wireless charging system positioned along an interior surface of the enclosure opposite the accessory charging region and configured to wirelessly transfer power between the portable electronic device and an accessory attached to the exterior surface of the enclosure over the accessory charging region, and a magnetic attachment mechanism positioned along the interior surface of the enclosure opposite the accessory attachment region and configured to attach the accessory to the accessory attachment surface. The magnetic attachment mechanism may include a magnet and a magnetic return component, the magnet configured to move from a rest position to an attachment position proximate the interior surface of the enclosure due to magnetic attraction to a magnetic component in the accessory, and return from the attachment position to the rest position due to magnetic attraction to the magnetic return component in response to the accessory being removed from the accessory attachment surface.

The enclosure may include a wall defining the accessory attachment surface, and the wall may be between the accessory and the magnetic attachment mechanism when the accessory is attached to the accessory attachment surface. The battery may be a first battery, the accessory may include a second battery, and the wireless charging system may be configured to charge the first battery with power from the second battery. The magnet may be a Halbach array including a plurality of permanent magnets. The magnetic attachment mechanism may include a frame structure defining a recess, and the magnet may be configured to slide within the recess between the rest position and the attachment position. The frame structure may further define a barrier wall between the magnet and the magnetic return component.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
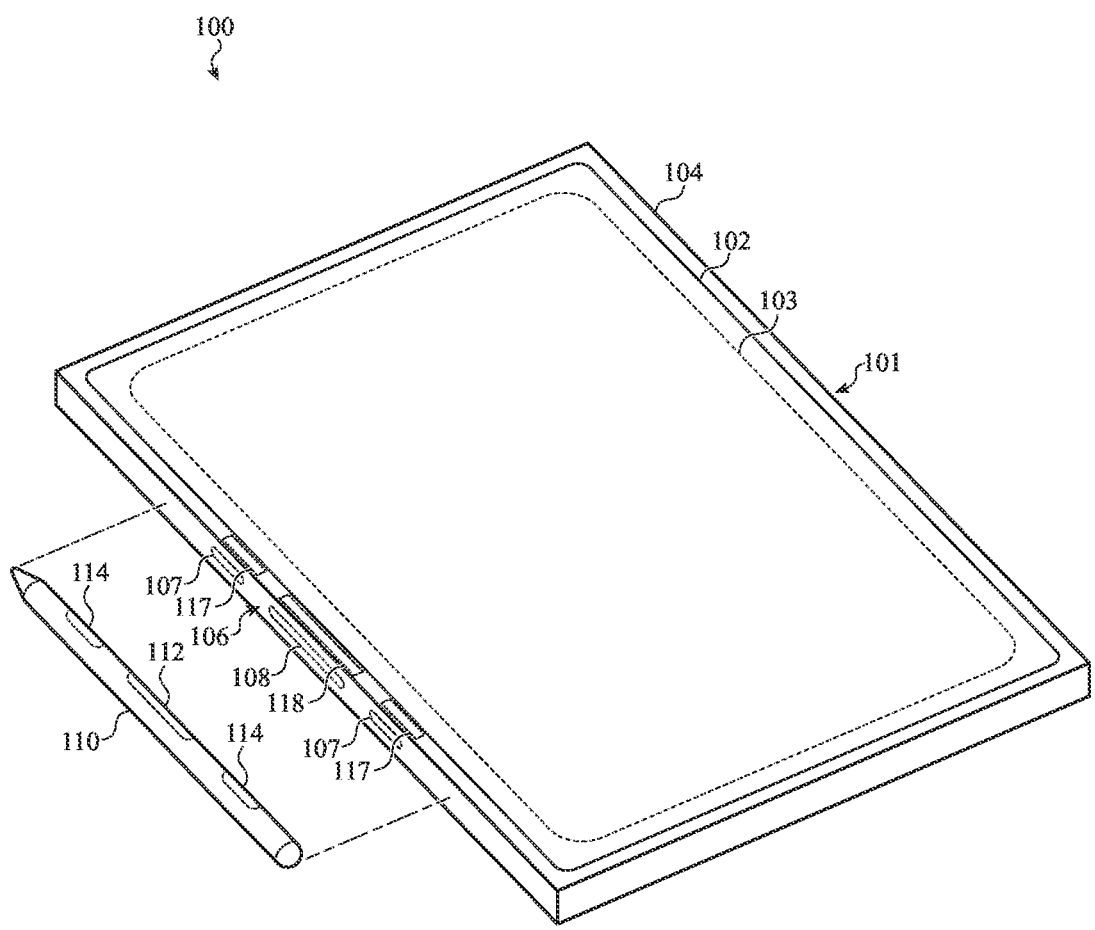
FIGS. 1A-1B depict an example electronic device and accessory.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Modern computer systems are increasingly usable with wireless accessories that increase or otherwise improve the functionality or usability of the device. For example, wireless headphones may be communicatively coupled to devices such as tablet computers and mobile phones to provide audio output to a user. As another example, an input device, such as a stylus, may be used to provide inputs to a tablet computer or other device with a touch-sensitive display. In some cases, certain accessories may magnetically attach or mount to a device, such as to help retain the accessory in a convenient location for storage and access. In some cases, devices and associated accessories may send and/or receive electrical power between them when the accessory is mounted on the device. For example, a stylus with a rechargeable battery may be wirelessly charged by a tablet computer when the stylus is attached to a particular attachment location of the tablet computer.

Magnetic attachment systems may be used to removably or magnetically couple an accessory to a device. However, attachment magnets can produce magnetic fields that extend outside of the devices in which they are positioned. Such external magnetic fields can be inconvenient, as they may attract unwanted objects such as keys or other objects, or they may interfere with speakers or other electronic devices. These effects may be reduced or mitigated by selecting less powerful magnets (or by positioning the magnets further inside the device and away from the exterior surfaces), but these approaches also reduce the strength of the magnetic attachment between the accessory and the device, and can lead to accidental detachment of the accessory and generally reduce the effectiveness of the system.

Described herein are magnetic attachment mechanisms that use movable magnets to provide a high degree of magnetic attraction to an accessory when the accessory is coupled to a device, while also reducing the magnetic field outside of the device when the accessory is decoupled from the device. For example, a magnetic attachment mechanism within a device such as a tablet computer may include a movable magnet that is movable between an attachment position and a rest position. When an accessory is positioned on an attachment surface of the device, the movable magnet may move from the rest position, where it is magnetically retained to a magnetic component within the device, to an attachment position that is nearer the attachment surface. In this way, when the movable magnet is in the attachment position, a greater amount of magnetic flux may be allowed to exit the device, thereby providing a strong attachment force to the accessory. When the accessory is removed and the movable magnet retracts back to the rest position (e.g., within the device and further away from the device housing), the amount of magnetic flux that is allowed to exit the device is lower, thereby reducing the potential for inadvertent magnetic attraction or other magnetic interference with other objects or devices. Accordingly, the magnetic attachment mechanisms described herein provide a higher attachment force without a resulting increase in the magnetic flux outside the device when the accessory is detached.

FIG. 1A shows an example electronic device 100 embodied as a tablet computing system, also referred to as a tablet computer. While the device 100 is shown as a tablet computer, the concepts presented herein may apply to any appropriate electronic devices, including portable electronic devices, laptop computers, handheld gaming devices, mobile phones, desktop computers, or the like. Accordingly, any reference to an "electronic device" encompasses any and all of the foregoing. FIG. 1A also shows an example accessory 110, embodied as a stylus for providing inputs to the device 100. While the accessory 110 is shown as a stylus, the concepts presented herein may apply equally to other accessories, including supplemental batteries (e.g., for charging or powering the device 100), headphones, wallet accessories, earbuds, keyboards, trackpads or other touch-sensitive input devices, or the like. The accessory 110 may be referred to as a stylus 110 for simplicity, though it will be understood that the associated discussions may apply to other accessories as well.

The electronic device 100 includes an enclosure 101 including a cover 102 and a housing member 104. The cover 102 (e.g., a front cover) may define a front exterior surface of the enclosure 101. The cover 102 may be positioned over a display 103 and may define an input surface on which touch inputs may be applied. As described herein, touch inputs may include inputs from one or more fingers, a stylus, or other input devices or implements. The cover 102 may be formed from glass, glass-ceramic, ceramic, plastic, sapphire, or other substantially transparent material, component, or assembly. The cover 102 may be formed as a monolithic or unitary sheet. The cover 102 may also be formed as a composite of multiple layers of different materials, coatings, and other elements.

The display 103 may be at least partially positioned within the enclosure 101 (e.g., the enclosure 101 may at least partially enclose the display 103). The display 103 may be coupled to the cover 102, such as via an adhesive or other coupling scheme. The display 103 may include a liquid-crystal display (LCD), light-emitting diode display, organic light-emitting diode (OLED) display, an active layer organic light emitting diode (AMOLED) display, organic electroluminescent (EL) display, electrophoretic ink display, or the like. The display 103 may be configured to display graphical outputs, such as graphical user interfaces, that the user may view and interact with.

The display 103 may include or be associated with one or more touch- and/or force-sensing systems. In some cases, components of the touch- and/or force-sensing systems are integrated with the display stack. For example, electrode layers of a touch- and/or force-sensor may be provided in a stack that includes display components (and is optionally attached to or at least viewable through the cover 102). The touch- and/or force-sensing systems may use any suitable type of sensing technology, including capacitive sensors, resistive sensors, surface acoustic wave sensors, piezoelectric sensors, strain gauges, or the like. The outer or exterior surface of the cover 102 may define an input surface (e.g., a touch- and/or force-sensitive input surface) of the device. While both touch- and force-sensing systems may be included, in some cases the device 100 includes a touch-sensing system and does not include a force-sensing system. The device 100, using the touch- and/or force-sensing systems, may be configured to detect inputs applied to the cover 102. Such inputs include, for example, touch inputs applied by one or more fingers, a stylus, or another implement. Touch-based inputs applied using fingers, styli, or other implements may include touches, taps, single- or multi-finger gestures (e.g., swipes, pinching gestures, etc.), handwriting inputs, drawing inputs, or the like. In some cases, force-sensing systems detect an amount of force associated with a touch-based input.

The housing member 104 may define exterior surfaces of the enclosure 101 (and of the electronic device 100), including the side exterior surface 106. The stylus 110 may be configured to magnetically attach to the side exterior surface 106 (or another exterior surface of the device). For example, the housing member 104 may define, along the side exterior surface 106, a stylus charging region 108 and one or more stylus attachment regions 107. The stylus charging region 108 corresponds to the location of a wireless charging module 118 within the device 100, which is aligned with a wireless charging module 112 within the stylus 110. As described herein, the wireless charging modules 112, 118 may wirelessly transfer power (e.g., transmit and/or receive power), such that the device 100 can charge a battery of the stylus 110 or otherwise power the stylus 110 (or other magnetically attached accessory), and/or such that an accessory can charge a battery of the device 100 or otherwise power the device 100.

The stylus attachment regions 107 may correspond to the locations of magnetic attachment mechanisms 117 within the device 100. The magnetic attachment mechanisms 117 may magnetically attach to corresponding magnetic components 114 (e.g., magnets and/or magnetic materials) within the stylus 110 (or other accessory). As described herein, the magnetic attachment mechanisms 117 may include movable magnets that retract away from the stylus attachment regions 107 when the stylus 110 is not attached to the side exterior surface 106 of the housing, and move towards the stylus attachment regions 107 when the stylus 110 is placed on or in close proximity to the side exterior surface 106.

The stylus attachment regions 107 and the stylus charging region 108 may be regions of a continuous exterior surface of the enclosure 101. For example, the side exterior surface 106 may be substantially flat and may lack moving parts or mechanisms, and the stylus 110 may include a complementary flat mounting surface that mates with or contacts the side exterior surface 106.

In some cases, the side exterior surface 106 is defined by a single piece of material, such as a polymer or metal member of the housing member 104. In cases where the side exterior surface 106 is defined by a metal or conductive material and the device includes a wireless charging module to wirelessly charge a stylus or other accessory through the housing member 104, the housing member may include a window of a dielectric or nonconductive material, such as a polymer, ceramic, glass, or the like, to facilitate wireless charging (e.g., by reducing interference with or resistance to inductive or other electromagnetic coupling between the wireless charging module and the accessory). The window may be aligned with the wireless charging module 118 and may be within (or may define) the stylus charging region 108. Similarly, the housing member may include a window of a dielectric, nonconductive, or nonmagnetic material, such as a polymer, ceramic, glass, or the like, aligned with the magnetic attachment mechanisms 117 to facilitate the magnetic flux passing through the side exterior surface 106.

Figure 1B:
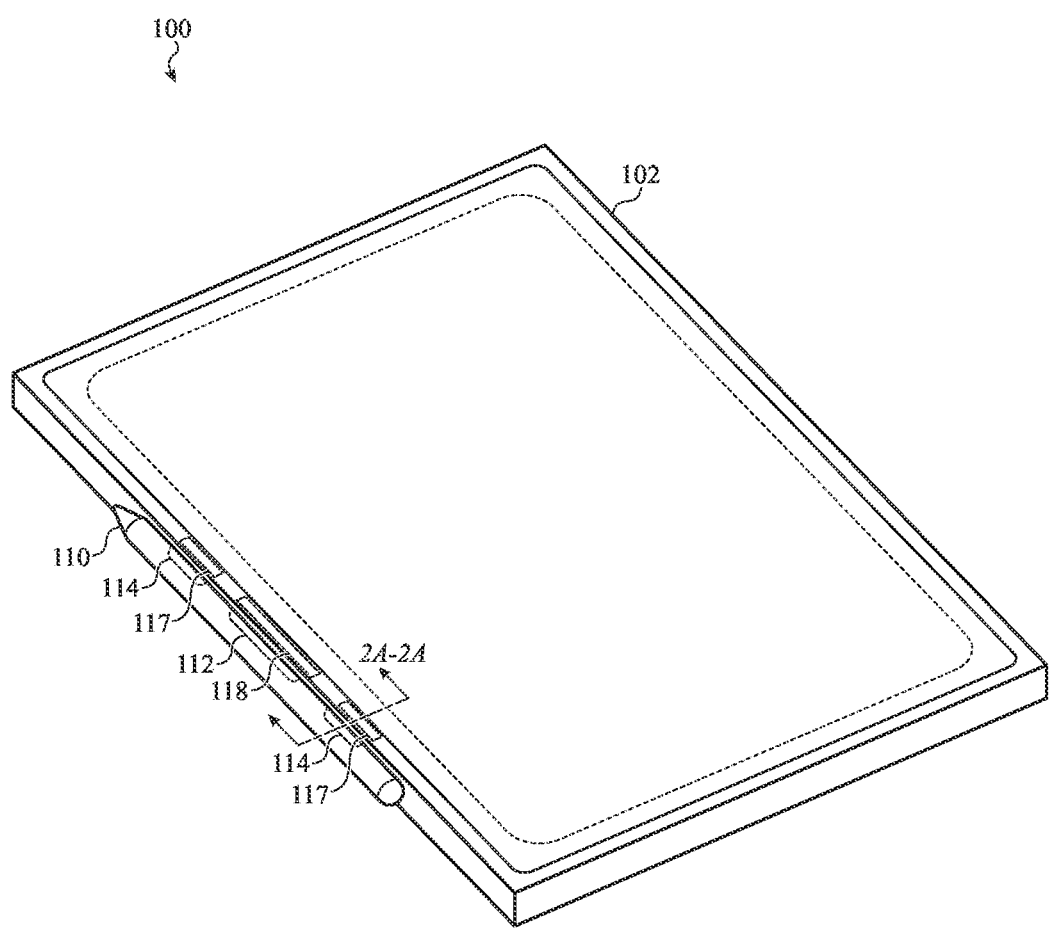

FIG. 1B illustrates the device 100 with the stylus 110 attached to the side exterior surface 106. In this configuration, the magnetic attachment mechanisms 117 magnetically retain the stylus 110 to the side exterior surface 106 by magnetically coupling to the magnetic components 114 in the stylus. Additionally, wireless charging may occur between the device 100 and the stylus 110 when the stylus is attached as shown in FIG. 1B. For example, the device 100 may provide power to the stylus 110 to charge a battery of the stylus. In other examples, such as where the accessory is a removable charging accessory (e.g., a battery accessory) or is otherwise configured to provide power to the device 100, the accessory may provide power to the device 100 to power the device and/or charge the battery of the device 100.

The magnetic attachment mechanisms 117 and the corresponding magnetic components 114 may be configured so that the stylus 110 can be releasably coupled to the device 100 in a limited number of predefined orientations. For example, the magnetic attachment mechanisms 117 and the corresponding magnetic components 114 may attract to one another (and thereby retain the stylus 110 to the device 100) when the stylus 110 is positioned with its tip facing in a first direction (e.g., as shown in FIG. 1B), as well as when the stylus 110 is positioned with its tip facing in a second direction opposite the first direction). The magnetic attachment mechanisms 117 and the corresponding magnetic components 114 may be configured to produce substantially the same attraction force between the stylus 110 and the device 100 regardless of which direction the stylus 110 is facing when attached to the device 100.

As described herein, the magnetic attachment mechanisms 117 may include movable magnets that are movable between a rest position and an attachment position. More particularly, the movable magnet may be retained in a rest position when the stylus 110 is not attached to the device 100, such as depicted in FIG. 1A. In the rest position, the movable magnet may be positioned further inward (e.g., towards a middle of the device or otherwise further away from the side exterior surface 106), such that the magnetic flux exiting the device 100 may be reduced. The movable magnet may move to and be retained in an attachment position when the stylus 110 is placed on the side exterior surface 106, as shown in FIG. 1B. For example, the magnetic components 114 may magnetically attract the movable magnets in the magnetic attachment mechanism towards the side exterior surface 106. The magnetic attraction overcomes a retention force that retains the movable magnet in the rest position, thereby causing the movable magnet to move to the attachment position and ultimately increasing the magnetic flux that exits the device and contributes to the magnetic attachment between the magnetic attachment mechanisms 117 and the magnetic components 114.

Figure 2A:
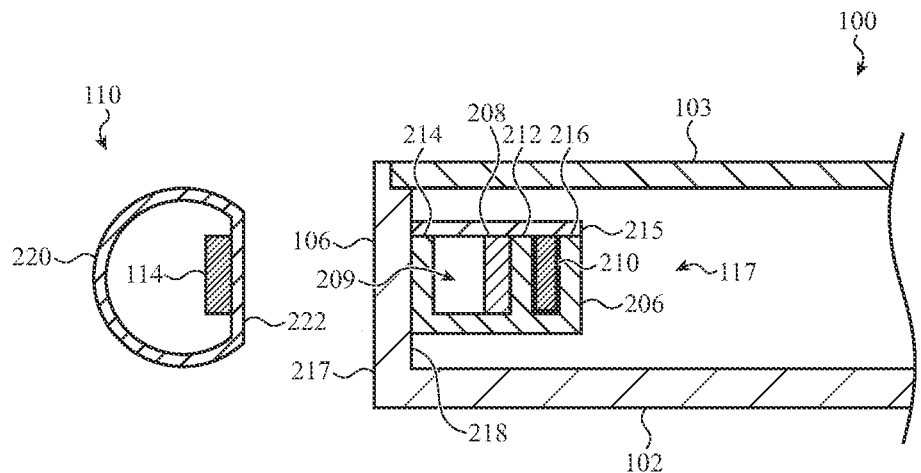
FIGS. 2A-2D depict partial cross-sectional views of the example electronic device and accessory of FIGS. 1A-1B.
Figure 2B:
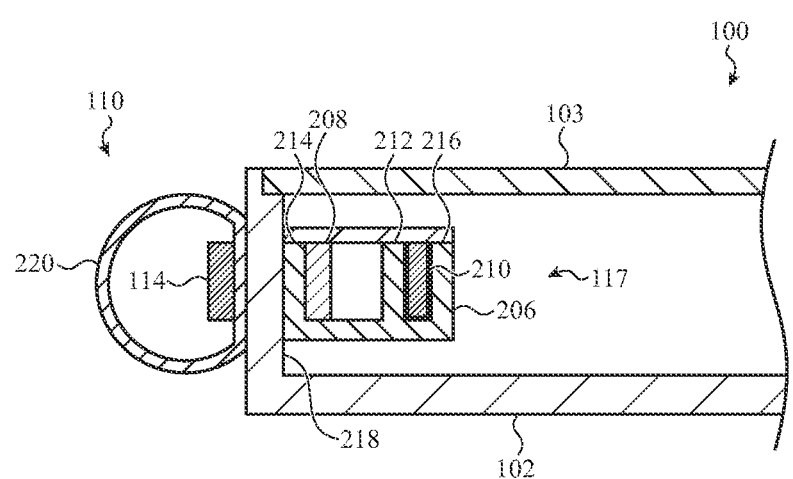

FIGS. 2A-2B illustrate a partial cross-sectional view of the device 100 and the stylus 110, viewed along line 2A-2A in FIG. 1B. FIG. 2A corresponds to FIG. 1A, in which the stylus 110 is not attached to the side exterior surface 106 of the device 100 and a movable magnet 208 of the magnetic attachment mechanism 117 is in a rest position, while FIG. 2B corresponds to FIG. 1B, in which the stylus 110 is positioned on (e.g., in contact with) the side exterior surface 106 of the device and the movable magnet 208 is in the attachment position.

FIGS. 2A-2B illustrate an example magnetic attachment mechanism 117 positioned within the device 100. The magnetic attachment mechanism 117 is positioned along an interior surface 218 of a wall 217 of the housing member 104. The wall 217 may also define the side exterior surface 106.

The magnetic attachment mechanism 117 includes a frame structure 206, a movable magnet 208, and a magnetic return component 210. The movable magnet 208 may include one or more permanent magnets. In some cases, the movable magnet may be a Halbach array, or other array that includes multiple permanent magnets (and optionally other components such as shunts, nonmagnetic materials, structural components and/or motion guides, or the like). The frame structure 206 may define a recess 209, and the movable magnet 208 may be positioned (and movable within) the recess 209. The frame structure 206 may optionally include a barrier wall 212 positioned between the movable magnet 208 and the magnetic return component 210. The frame structure 206 may also optionally include outer walls 214 and 216, which may define at least partially enclosed (and optionally fully enclosed) chambers for the movable magnet 208 and the magnetic return component 210. The frame structure 206 may also include (or be coupled to) a cover 215, which may enclose the chambers and retain the movable magnet 208 and the magnetic return component 210 to the frame structure 206. In some cases, the frame structure 206 may have a different configuration. For example, the frame structure 206 may not include the wall 214, and instead the wall 217 may enclose the chamber containing the movable magnet 208. In such cases, the movable magnet 208 may be able to contact the interior surface 218 of the wall 217 in the attachment position.

In some cases, the magnetic attachment mechanism 117 does not include a frame structure. In such cases, the movable magnet 208 may be positioned in a recess or other retention feature of the housing member 104. For example, the wall 217 may include a recess or other retention feature integrally formed with the wall 217 (e.g., machined or otherwise formed in the material of the housing member itself).

The magnetic return component 210 may be coupled to the frame structure 206, or otherwise positioned such that the movable magnet 208 (also referred to simply as magnet 208) is attracted to the magnetic return component 210 when the stylus 110 is not in contact with or in close proximity to (e.g., within about 1.0 cm) the side exterior surface 106. Under these conditions, the magnet 208 moves to and/or is retained in the rest position. In some cases, the frame structure 206 defines (or the magnetic attachment mechanism otherwise includes) a barrier wall 212 between the magnetic return component 210 and the magnet 208. In such cases, the magnet 208 may contact (and be retained against) the barrier wall 212 when the magnet 208 is in the rest position. The barrier wall 212 may be formed from or include a material that reduces or minimizes audible clicks or other noises when the magnet 208 is returned to the rest position and contacts the barrier wall 212. For example, the barrier wall 212 may be formed from a polymer material, and/or may include a coating along the surface that contacts the magnet 208 and/or the surface that contacts the magnetic return component 210. Example coating materials include polymer coatings, elastomer coatings, and paint.

FIG. 2B illustrates the state of the magnetic attachment mechanism 117 when the stylus 110 is positioned on the side exterior surface 106. In particular, when the stylus 110 is moved towards the side exterior surface 106, the magnetic attraction between the magnet 208 and the magnetic component 114 in the stylus 110 overcomes the magnetic attraction between the magnet 208 and the magnetic return component 210, resulting in the magnet 208 moving from the rest position (FIG. 2A) to the attachment position (FIG. 2B). In the attachment position, the magnet 208 is closer to the interior surface 218 of the wall 217 than when it is in the rest position. By moving closer to the wall 217, a greater amount of magnetic flux from the magnet 208 may exit the device 100, thereby resulting in greater magnetic attraction between the magnet 208 and the magnetic component 114 in the stylus (as compared to the force that would be possible if the magnet 208 were fixed in the rest position, for example).

When the stylus 110 is removed from the side exterior surface 106, the magnetic attraction between the magnetic component 114 and the magnet 208 is reduced and ultimately ceases. Once the magnetic attraction to the magnetic component 114 is lower than the magnetic attraction to the magnetic return component 210, the magnet 208 will move from the attachment position (FIG. 2B) to the rest position (FIG. 2A), thus reducing the magnetic flux that exits or can be detected outside of the device 100.

Because the magnet 208 can move to a rest position that is further away from the wall 217, a stronger magnet may be used (and thus a stronger magnetic attraction may be achieved) without resulting in an undesirable leakage of magnetic flux. More particularly, magnetic flux exiting a device may be inconvenient, as it can attract unintended objects or interfere with other objects or devices (e.g., speakers). For these purposes, minimizing the magnetic flux that exits the device 100 may be advantageous. However, minimizing the magnetic flux also reduces the attraction force of the magnet and can lead to accidental detachment of the stylus or other accessory. Accordingly, because the movable magnet 208 is retained at a greater distance away from the interior surface 218 of the wall 217 (e.g., in the rest position) when the stylus 110 is not on the side exterior surface 106 (or in close proximity to the side exterior surface 106, such as within about 1.0 cm), a magnet that produces a target magnetic attraction force may be used while also producing less external flux than would otherwise be produced by that same magnet. In some cases, the magnetic attachment mechanisms described herein may be configured to produce less than a certain target leakage flux when measured at the surface of the device. The target leakage flux may be less than about 2500 Gauss, less than about 2200 Gauss, less than about 2000 Gauss, less than about 1800 Gauss, or another suitable value or range.

The distance between the attachment position (FIG. 2B) and the rest position (FIG. 2A) of the magnet 208 may be between about 2.0 mm and about 0.5 mm, or between about 0.15 mm and about 1.0 mm, or between about 0.25 mm and about 0.75 mm. Other travel distances are also contemplated.

FIGS. 2A-2B also illustrate an example configuration of the stylus 110 and arrangement of the magnetic component 114 in the stylus. For example, the stylus 110 may include a housing 220 defining an attachment surface 222. The attachment surface 222 may be substantially flat (e.g., planar), and may be configured to mate to the substantially flat (e.g., planar) side exterior surface 106 of the wall 217. The magnetic component 114 may be positioned against or proximate an interior surface of the wall 217 opposite the attachment surface 222.

The frame structure 206 may be formed from any suitable material(s), such as polymer, metal, composites, carbon fiber, or the like. In some cases, the frame structure 206 may be nonmagnetic or nonmetallic, such that the material of the frame structure 206 does not substantially interact with or change the magnetic flux of the magnetic components of the system (e.g., the movable magnet 208, the magnetic return component 210, and the magnetic component 114). In some cases, at least some parts of the frame structure operate as magnetic shunts to change, guide, or otherwise affect the magnetic flux around the magnetic attachment mechanism 117. For example, the wall 216 may be formed from a metal or other suitable material to shunt magnetic flux from the movable magnet 208 (and/or the magnetic return component 210) to reduce the amount of magnetic flux that enters the device 100.

The frame structure 206 may include coatings to reduce friction or otherwise facilitate smooth movement of the movable magnet 208 within the recess 209. For example, one or more surfaces of the recess 209 may include a polymer coating (e.g., Polytetrafluoroethylene) or the like. In some cases, the friction between the movable magnet 208 and the surfaces of the recess 209 may be sufficiently low to prevent or mitigate binding, sticking, or other misalignments of the movable magnet 208 within the recess 209.

The operation of the magnetic attachment mechanism 117 may be achieved with various combinations of magnets and magnetic components. In particular, the properties of the magnets and magnetic components (e.g., material, size, magnetic strength, travel distance of the movable magnet, etc.) may be selected so that the attraction force between the accessory and the movable magnet when the movable magnet is in the rest position is greater than the attraction force between the movable magnet and the magnetic return component. These properties may also be selected so that the attraction force between the movable magnet and the magnetic return component when the movable magnet is in the attachment position (but the accessory is not nearby) is greater than any residual or incidental magnetic attraction between the movable magnet and any other components or objects in the device 100. In this way, the performance of the movable magnet, and the magnetic attachment mechanism as a whole, described above may be achieved.

For example, the magnet 208 may be formed from one or more permanent magnets, such as a single permanent magnet, or an array (e.g., a Halbach array or other arrangement) of permanent magnets. The magnetic component 114 of the accessory may be a permanent magnet or a ferromagnetic material (or other material that is magnetically attracted to a permanent magnet). The magnetic return component 210 may be a permanent magnet or a ferromagnetic material (or other material that is magnetically attracted to a permanent magnet). In some cases, the magnetic return component 210 may be omitted, and the frame structure 206 (or a portion of the frame structure 206, such as the wall 216) may be formed from a permanent magnet or ferromagnetic material and may provide the functionality of the magnetic return component 210. Further, while the magnet 208 is described as a permanent magnet, the magnetic attachment mechanism 117 may also use a movable magnetic shunt instead of a movable magnet in order to vary the amount of magnetic flux that exits the device 100 when the accessory is not present.

Figure 2C:
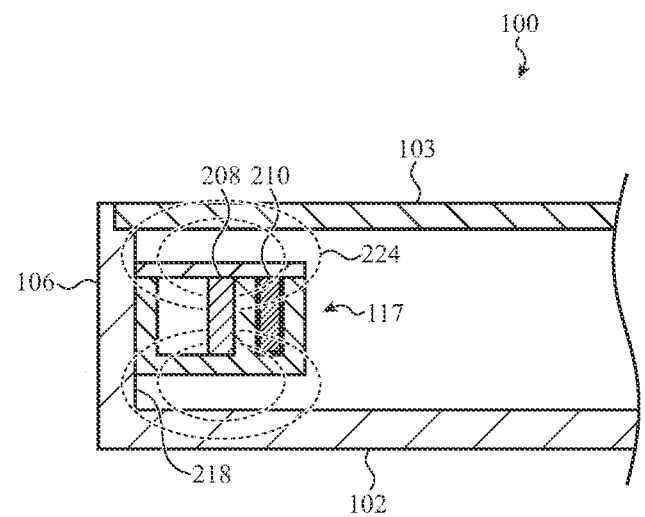
Figure 2D:
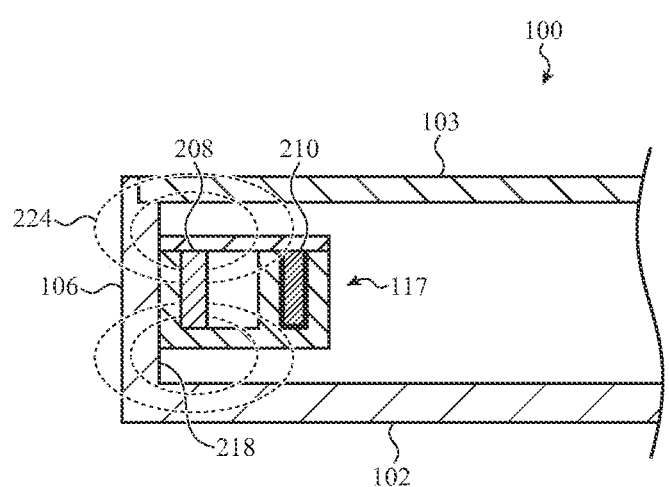

FIGS. 2C-2D illustrate an example of how the movable magnet 208 of the magnetic attachment mechanism 117 may result in less magnetic flux exiting the device 100 while allowing a strong attraction force. In particular, FIG. 2C illustrates the magnetic attachment mechanism 117 when the magnet 208 is in the rest position (e.g., attracted to the magnetic return component 210). FIG. 2D illustrates the magnetic attachment mechanism 117 when the magnet 208 is in the attachment position (e.g., attracted to a magnetic component of an accessory, not shown in FIG. 2D). As shown, a greater amount of magnetic flux 224 from the magnet 208 exits the device 100 when the magnet 208 is in the attachment position (FIG. 2D) than when it is in the rest position (FIG. 2C). FIGS. 2C-2D are for illustration only, and do not necessarily represent the shape, size, or strength of the magnetic flux of the movable magnet 208.

While the figures illustrate an example in which the magnetic attachment mechanism 117 (with the movable magnet 208) is positioned in the device 100, other configurations are also possible. For example, the magnetic attachment mechanism 117 may be positioned in the accessory (e.g., in place of the magnetic components 114). In such cases, the device 100 may include a magnetic component (such as a permanent magnet or ferromagnetic material), and/or it may include an additional magnetic attachment mechanism 117. In the latter case, the magnetic attachment mechanisms of the accessory and the device may be configured so that the attraction force on the movable magnets when the accessory and the device are brought into proximity with each other overcomes the retention force of the magnets in their rest position, thereby causing them both to move to their respective attachment positions and retain the accessory to the device.

Figure 3:
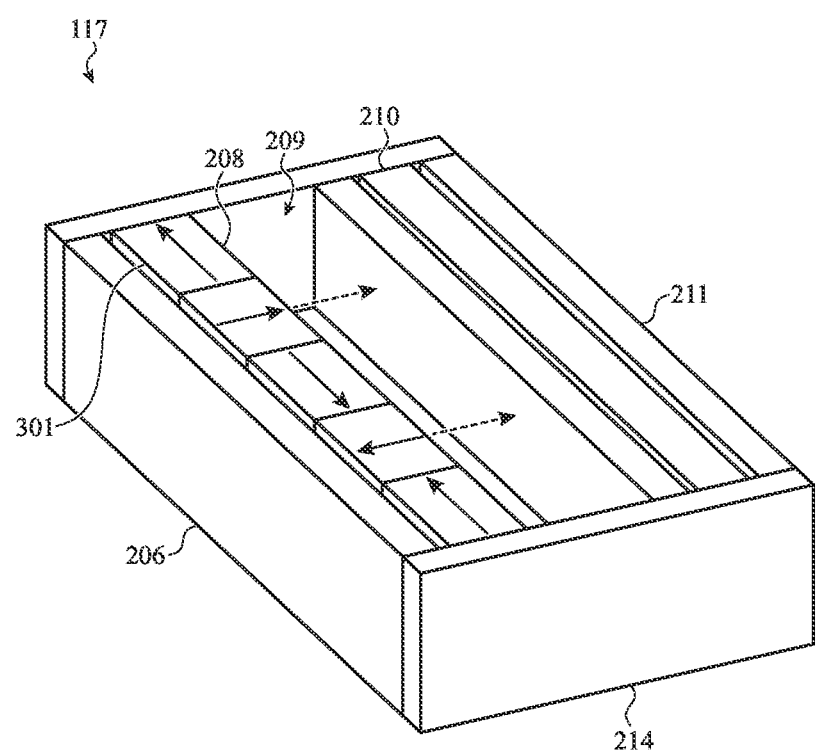
FIG. 3 depicts an example magnetic attachment mechanism.

FIG. 3 illustrates a partial view of the magnetic attachment mechanism 117. This example may represent a magnetic attachment mechanism with a cap or cover (e.g., the cover 215) removed, or an example magnetic attachment mechanism that does not include a cap or cover that is coupled to the frame structure 206. As shown, the frame structure 206 defines a recess 209 in which the magnet 208 is positioned, as well as a recess 211 in which the magnetic return component 210 is positioned. In this example, the magnet 208 may be free to move within the recess 209.

In this example, the magnet 208 is a Halbach array, including a plurality of permanent magnet segments 301 having different magnetic field orientations (as indicated by the arrows on each segment). The magnet 208 may be positioned in the frame structure 206 so that the maximum magnetic field and/or flux is facing a desired direction. For example, the maximum magnetic flux (e.g., the side of the magnet 208 having the strongest potential magnetic attraction) may be facing away from the magnetic return component 210 (e.g., towards the wall 214 of the frame structure, and ultimately towards the accessory). This arrangement may also orient the side with the lowest flux (e.g., lowest potential magnetic attraction) towards the magnetic return component 210, which may help ensure that the attraction force between the magnet 208 and the accessory is greater than the attraction force between the magnet 208 and the magnetic return component 210.

As described herein, one or more surfaces of the frame structure 206 and/or the magnet 208 may include a low-friction coating or surface to facilitate free movement of the magnet 208 between the attachment and rest positions. For example, a coating of a low-friction material, such as polytetrafluoroethylene, may be applied to interfacing surfaces of the magnet 208 and/or the frame structure 206 (e.g., the surfaces that contact one another and/or slide against one another during operation of the magnetic attachment mechanism). As another example, the interfacing surfaces of the magnet 208 and the frame structure 206 are impregnated with a low-friction material such as graphite. As yet another example, the interfacing surfaces may be coated with an oil, grease, graphite powder, or other lubricant to reduce friction.

Figure 4:
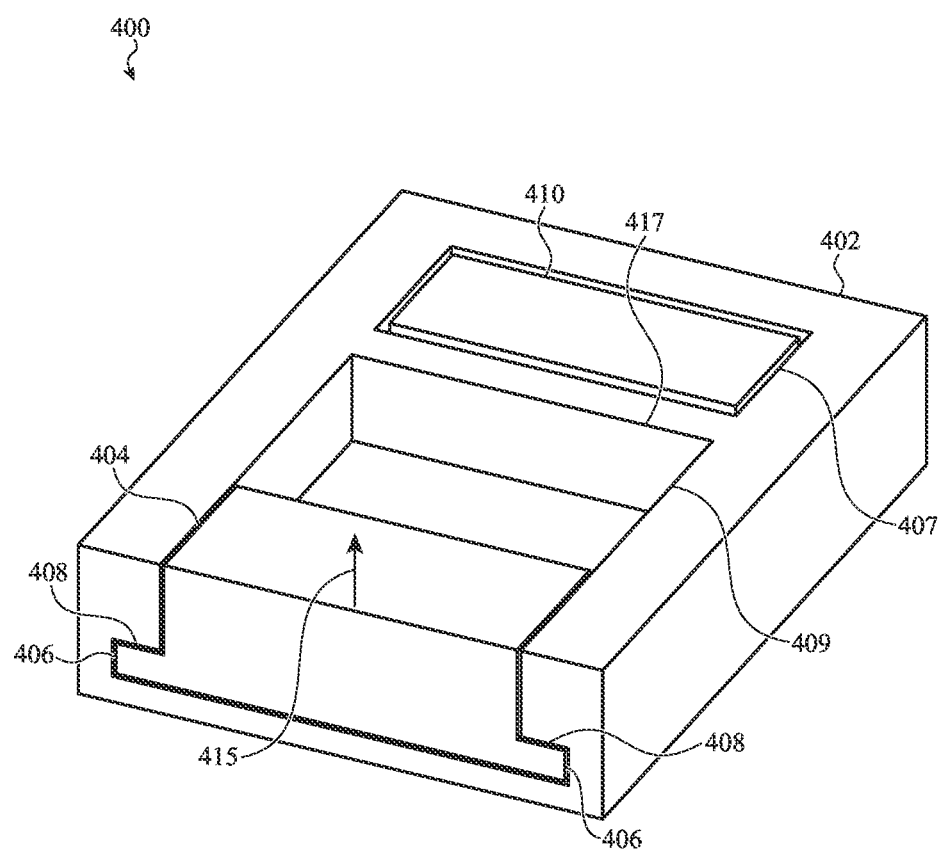
FIG. 4 depicts another example magnetic attachment mechanism.

FIG. 4 depicts another example magnetic attachment mechanism 400. The magnetic attachment mechanism 400 includes a frame structure 402 that defines recesses 407 and 409. A magnetic return component 410 is positioned in the recess 407, and a movable magnet 404 is positioned in the recess 409. The frame structure 402, magnetic return component 410, and movable magnet 404 may be embodiments of or otherwise similar to the corresponding components described with respect to FIGS. 2A-3.

In the example of FIG. 4, the movable magnet 404 and the frame structure 402 may define complementary guide structures to guide the movable magnet 404 along a predefined path when it is moved between an attachment position and a rest position. For example, the frame structure 402 defines channels 408 and the movable magnet 404 defines flanges 406 that extend into the channels 408. The channels 408 and flanges 406 may cooperate to guide the magnet along a substantially linear path between the attachment position, shown in FIG. 4, and a rest position in which the movable magnet 404 is retained to the magnetic return component 410 (e.g., against a barrier wall 417). The channels 408 and flanges 406 may also inhibit binding, racking, or other misalignments of the movable magnet 404 within the frame structure 402.

The engagement between the channels 408 and flanges 406 may also prevent or limit motion of the movable magnet 404 in other directions (e.g., direction 415). Accordingly, the channels 408 and flanges 406 may retain the movable magnet 404 to the frame structure 402 by preventing it from decoupling or becoming detached from the frame structure 402.

While FIG. 4 illustrates the movable magnet 404 defining flanges and the frame structure 402 defining channels, in other examples these features may be swapped. For example, the movable magnet 404 may define channels, and the frame structure 402 may define flanges or other features that extend into the channels to guide and retain the movable magnet 404 as described. Other complementary features may also be defined or included in the frame structure 402 and the movable magnet 404.

As described with respect to FIG. 3, one or more surfaces of the frame structure 402 and/or the movable magnet 404 may include a low-friction coating or surface to facilitate free movement of the movable magnet 404 between the attachment and rest positions. For example, a coating of a low-friction material, such as polytetrafluoroethylene, may be applied to interfacing surfaces of the movable magnet 404 and/or the frame structure 402, including interfacing surfaces of the channels 408 and flanges 406 (or other surfaces that contact one another and/or slide against one another during operation of the magnetic attachment mechanism). As another example, the interfacing surfaces of the movable magnet 404 and the frame structure 402 are impregnated with a low-friction material such as graphite. As yet another example, the interfacing surfaces may be coated with an oil, grease, graphite powder, or other lubricant to reduce friction.

While FIGS. 1A-4 illustrate the magnetic attachment system being used to releasably secure a stylus to a tablet computer, this is merely one example application for the magnetic attachment systems described herein, and the magnetic attachment systems may be used to magnetically secure other components or devices together. For example, the magnetic attachment systems may be used to releasably secure a lid of a notebook computer in a closed position. As another example, the magnetic attachment mechanisms may be used to releasably secure a charging cable or wireless charging system to a device (e.g., notebook computer, mobile phone, tablet computer, watch). As another example, the magnetic attachment mechanisms may be used to releasably secure a lid or cover (e.g., a cover of a protective case) to a device (e.g., to a tablet computer, phone, etc.). Other applications are also contemplated.

Movable magnets that move between a rest and an attachment position, as described herein, may also be employed to releasably attach or retain various different devices, components, and/or accessories to one another. In some cases, the movable magnets and associated techniques and structures may be used with or as part of latch mechanisms that provide a mechanical latching or engagement function between two devices, components, or accessories. In such cases, the movable magnets may operate to release and/or engage physical latch mechanisms, as described herein.

Figure 5A:
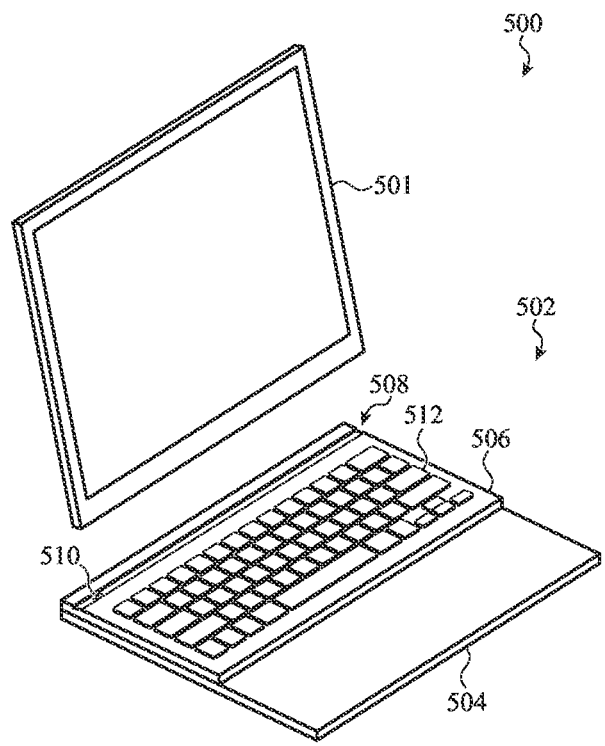
FIGS. 5A-5B depict an example computing component and accessory.
Figure 5B:
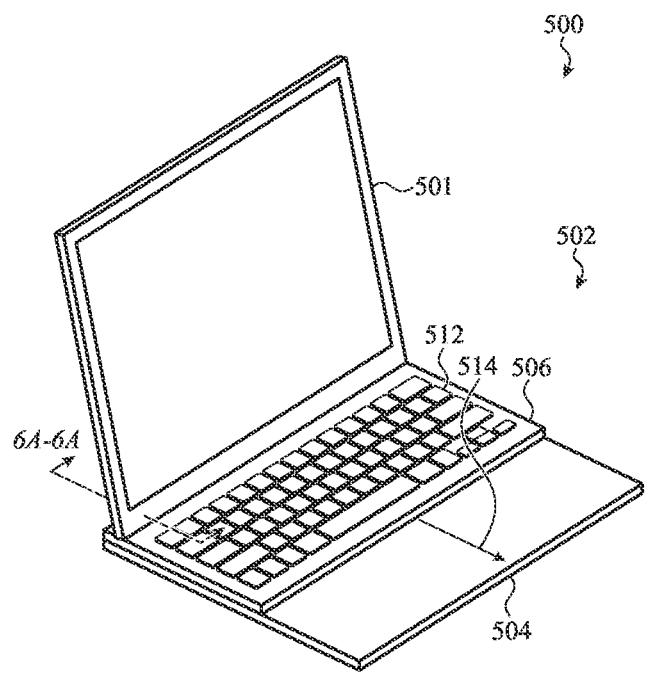

FIGS. 5A-5B illustrate an example computing system 500 that may employ a magnetically actuated latch mechanism. The computing system 500 may include a computing component, illustrated as a tablet computer 501, and an accessory, illustrated as a keyboard accessory 502 with a movable keyboard structure. While the example computing component and accessory are shown as a tablet computer 501 and a keyboard accessory 502, other types of computing components and accessories are also contemplated. For example, the computing component may be a smartphone, a watch, a notebook computer, or the like, and the accessory may be a charging dock, a trackpad accessory, a gaming accessory, or the like.

The keyboard accessory 502 may include a stationary portion 504 and a movable portion 506. The movable portion 506 may include a keyboard 512. The keyboard accessory 502 may receive typing inputs via the keyboard 512, and communicate the inputs to the tablet computer 501 (e.g., via a wired or wireless communication interface). In some cases, the keyboard accessory 502 includes other types of input devices instead of or in addition to the keyboard, such as a trackpad, directional pad, microphone, or the like, and may communicate inputs received at those input devices to the tablet computer 501 via a wired or wireless communication interface.

The movable portion 506 may also define an accessory retention slot 508 that is configured to receive at least a portion of the tablet computer 501 therein. The slot 508 may include or be defined in part by a mounting surface 510. A side of the tablet computer 501 may contact the mounting surface 510 when the tablet computer 501 is positioned in the accessory retention slot 508 (also referred to simply as a slot 508).

The movable portion 506 may be movable relative to the stationary portion 504. For example, as shown in FIG. 5B, the movable portion 506 may be movable along a direction 514 to allow a user to position the movable portion 506, and thus the keyboard 512, at a different position relative to the user. Thus, the keyboard accessory 502 may accommodate different hand or arm positions of a user, or otherwise allow more flexibility in the positioning of the keyboard 512.

In the example shown, the tablet computer 501 is configured to attach to the movable portion 506, and thus the tablet computer 501 moves in conjunction with the movable portion 506. In other examples, the tablet computer 501 couples to the stationary portion 504, such that the movable portion 506 moves separately from the tablet computer 501. In such cases, the slot 508 (and the mounting surface 510) may be positioned on the stationary portion 504.

The movable portion 506 of the accessory 502 may be positioned in a docked position and in a locked or latched condition when the tablet computer 501 is decoupled from the accessory 502, as shown in FIG. 5A. When the tablet computer 501 is coupled to the accessory 502, as shown in FIG. 5B, the movable portion 506 of the accessory 502 may become unlocked or unlatched so that it can be moved to a desired position relative to the stationary portion 504. While FIGS. 5A-5B illustrate an example in which the movable portion 506 and the keyboard 512 are exposed and/or accessible in the docked position, in other cases, the movable portion 506 is hidden or stowed when in the docked position, and the unlocking or unlatching operation that occurs when the tablet computer 501 is attached to the accessory allows the movable portion 506 to be slid or moved into an accessible location relative to the stationary portion 504.

Figure 6A:
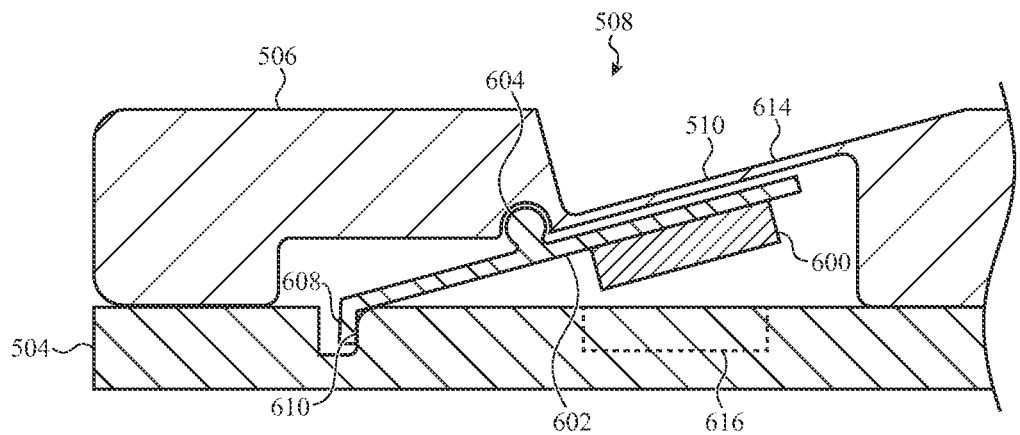
FIGS. 6A-6B depict partial cross-sectional views of an example computing component and accessory, illustrating an example latching mechanism.
Figure 6B:
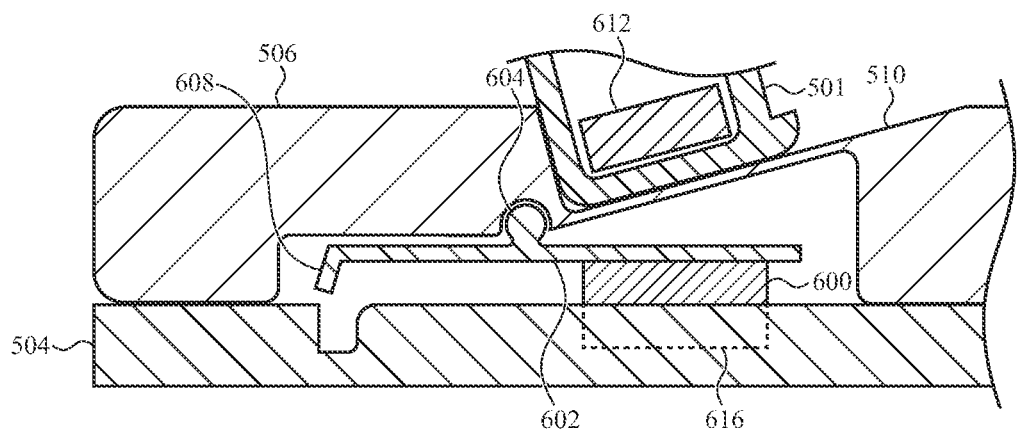

FIGS. 6A-6B illustrate partial cross-sectional views of the computing system 500 of FIGS. 5A-5B, viewed along line 6A-6A in FIG. 5B, illustrating an example latching mechanism that can be selectively latched and unlatched to alternatively retain the movable portion 506 in a docked position or allow the movable portion 506 to move relative to the stationary portion 504. As described herein, FIG. 6A illustrates the latching mechanism in a latched or locked configuration, in which the movable portion 506 is retained in a particular position (e.g., the docked position, and FIG. 6B illustrates the latching mechanism in an unlatched or unlocked configuration, in which the movable portion 506 is movable relative to the stationary portion 504.

As shown in FIG. 6A, the latching mechanism of the accessory 502 includes a latch member 602. The latch member 602 may be movable between a latched configuration (FIG. 6A) and an unlatched configuration (FIG. 6B). The latch member 602 may be pivotally coupled to the movable portion 506 via a pivot mechanism 604.

In the latched configuration, a latch feature 608 of the latch member 602 engages a retention feature 610 (e.g., a wall, lip, flange, or other feature) of the stationary portion 504. The engagement between the latch feature 608 and the retention feature 610 prevents or inhibits the movable portion 506 from moving relative to the stationary portion 504 (at least in one direction, such as to the right as oriented in FIG. 6A).

A magnet 600 may be coupled to the latch member 602 and may interact with a magnet 612 (FIG. 6B) in the tablet computer 501 to disengage the latching mechanism. For example, the magnet 600 and the magnet 612 may repel each other when the tablet computer 501 is placed in the retention slot 508 on the mounting surface 510. For example, the magnets 600, 612 may be oriented in their respective devices so that the same magnetic poles are facing one another when the tablet computer 501 is in the retention slot 508. The repulsion between the magnets 600, 612 forces the latch member 602 to move in a manner that disengages the latch feature 608 from the retention feature 610. As shown in FIGS. 6A-6B, for example, the repulsion forces between the magnets cause a first side of the latch member 602 to be forced downward, causing the latch member 602 to pivot or rotate, thereby moving (e.g., lifting) the latch feature 608 out of engagement with the retention feature 610. The magnets 600, 612 may produce a repulsion force that biases the latch member 602 in the unlatched configuration as long as the tablet computer 501 is positioned in the retention slot 508. In this manner, the movable portion 506 of the accessory can move relative (e.g., slide horizontally, as oriented in FIGS. 6A-6B) to the stationary portion 504.

The latch member 602 may be biased into the latched or engaged orientation, such that upon removal of the tablet computer 501 from the retention slot 508, the latch member 602 will reengage the retention feature 610 when the movable portion 506 is positioned in the docked position. The latch member 602 may be biased into the latched orientation (shown in FIG. 6A) via a spring, such as a torsion spring, coil spring, elastomer or polymer member, leaf spring, or the like. In some cases, the latch member 602 may be biased into the latched orientation via magnetic forces. For example, the magnet 600 may be magnetically attracted to an optional magnetic portion 614 of the movable portion 506. The magnetic portion 614 may be a magnetic material from which the movable portion 506 is formed, or a magnet and/or ferromagnetic material that is coupled to the movable portion 506. As another example, the magnet 600 may be magnetically repelled by an optional magnet 616 positioned in the stationary portion 504, which repels the magnet 600 and thereby biases the latch member 602 into the latched or engaged position. Regardless of how the latch member 602 is biased into the latched or engaged position, the repulsion force between the magnets 600, 612 may be sufficient to overcome the biasing force and disengage the latch member 602.

Figure 7A:
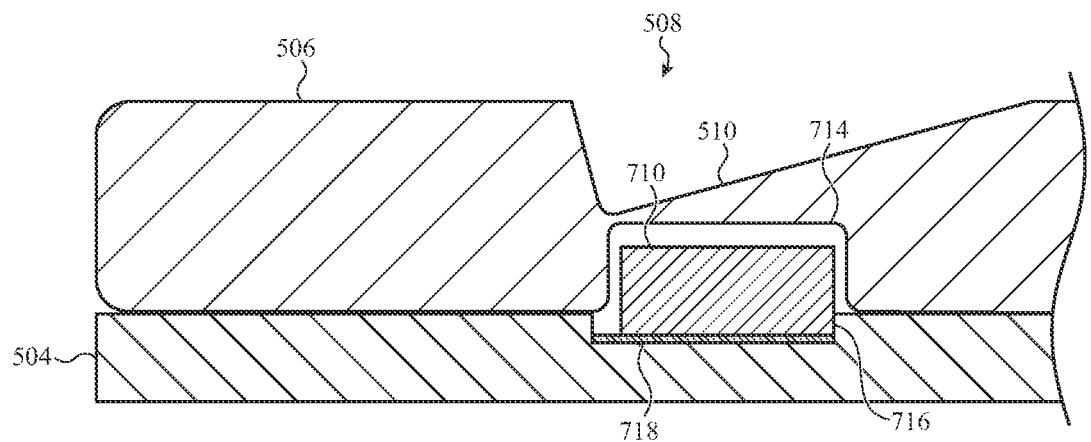
FIGS. 7A-7B depict partial cross-sectional views of an example computing component and accessory, illustrating another example latching mechanism.
Figure 7B:
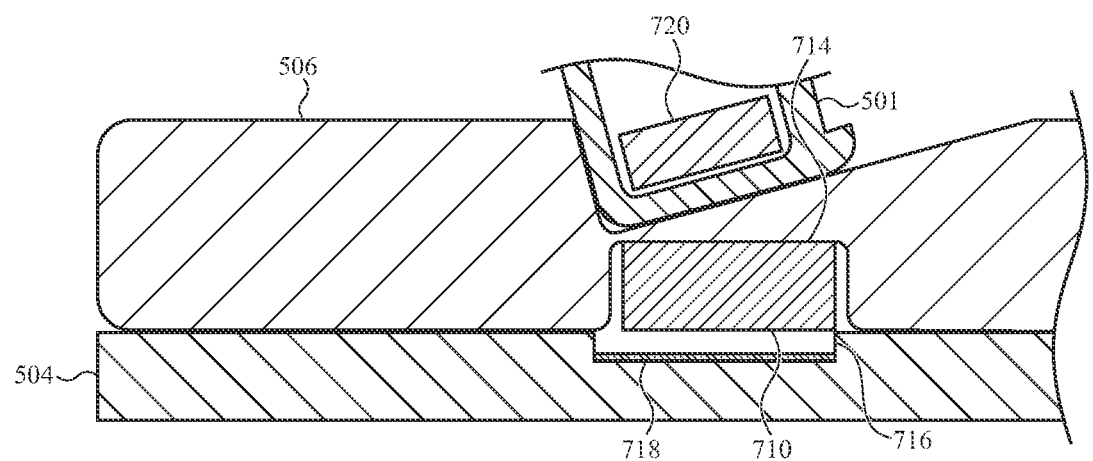

FIGS. 7A-7B illustrate another example latching mechanism that may be used in the computing system 500. In this example, a movable magnet 710 may be moved between an engaged position (FIG. 7A) and a disengaged position (FIG. 7B). In the engaged position, the movable magnet 710 may inhibit movement of the movable portion 506 relative to the stationary portion 504. For example, the movable magnet 710 may be positioned in a recess 714 in the movable portion 506 (or otherwise movably attached to the movable portion 506) such that the movable magnet 710 can move between the engaged position in which the movable magnet 710 overlaps a retention feature 716 (e.g., a wall, lip, flange, or other feature) in the stationary portion 504, and the disengaged position in which the movable magnet 710 does not overlap the retention feature 716. Thus, when the movable magnet 710 is in the engaged position, the overlap between the movable magnet 710 and the retention feature 716 (as well as the movable magnet 710 being at least partially captured in the recess 714) prevents the movable portion 506 of the accessory from moving.

The movable magnet 710 may be retained in the engaged position via a magnetic return component 718. The magnetic return component 718 may be an embodiment of the magnetic return component 210 described above, and the discussion of the magnetic return component 210 may apply equally or by analogy to the magnetic return component 718. For example, the magnetic return component 718 may be a permanent magnet or a ferromagnetic material (or other material that is magnetically attracted to a permanent magnet). In some cases, the magnetic return component 718 may be omitted, and the stationary portion 504 (or a portion thereof) may be formed from a permanent magnet or ferromagnetic material and may provide the functionality of the magnetic return component 718.

When the tablet computer 501 is positioned in the retention slot 508, the movable magnet 710 may be magnetically attracted to a magnetic component 720 in the tablet computer 501. The magnetic attraction between the movable magnet 710 and the magnetic component 720 overcomes the magnetic attraction between the movable magnet 710 and the magnetic return component 718, such that the movable magnet 710 detaches from the magnetic return component 718 and moves to the disengaged position. Thus, when the tablet computer 501 is removed from the retention slot 508 and the movable portion 506 is returned to its docked position, the movable magnet 710 is again attracted to the magnetic return component 718 and moves to (and is magnetically retained in) the engaged position.

Figure 8A:
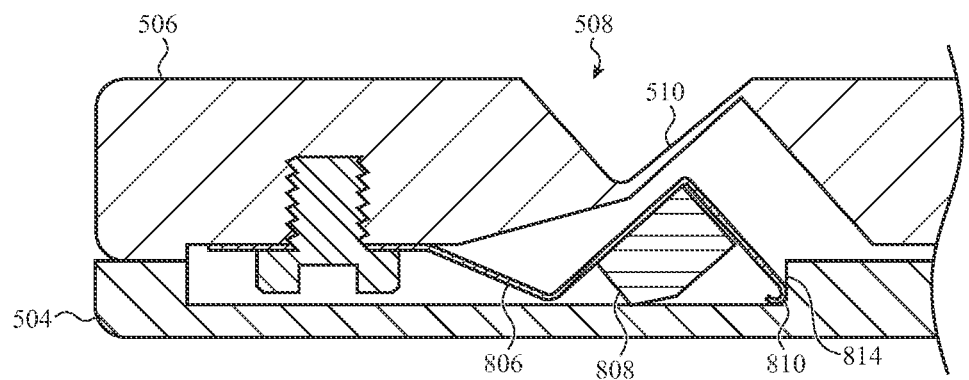
FIGS. 8A-8B depict partial cross-sectional views of an example computing component and accessory, illustrating another example latching mechanism.
Figure 8B:
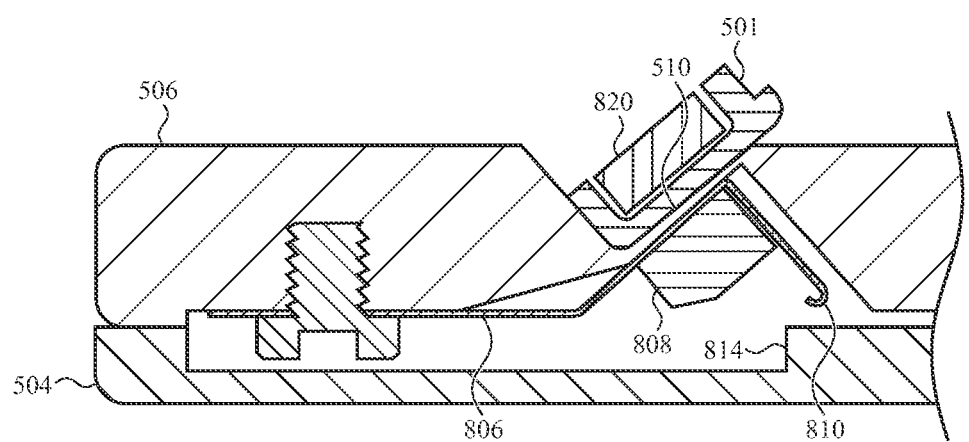

FIGS. 8A-8B illustrate another example latching mechanism that may be used in the computing system 500. In this example, a magnet 808 on a spring member 806 may be moved between an engaged position (FIG. 8A) and a disengaged position (FIG. 8B). In the engaged position, the spring member 806 may inhibit movement of the movable portion 506 relative to the stationary portion 504. For example, the spring member 806 may be biased into an engaged position in which a latching portion 810 of the spring member 806 overlaps or otherwise engages with a retention feature 814 (e.g., a wall, lip, flange, or other feature). The engagement between the latching portion 810 and the retention feature 814 inhibits motion of the movable portion 506.

When the tablet computer 501 is positioned in the retention slot 508, the magnet 808 may be magnetically attracted to a magnetic component 820 in the tablet computer 501. The magnetic attraction between the magnet 808 and the magnetic component 820 overcomes the biasing force of the spring member 806, such that the spring member 806 is deflected or otherwise moved in order to disengage the latching portion 810 from the retention feature 814 (as shown in FIG. 8B). When the tablet computer 501 is removed from the retention slot 508, the biasing force of the spring member 806 biases the latching portion 810 towards its engaged configuration. Thus, when the tablet computer 501 is removed from the retention slot 508 and the movable portion 506 is returned to its docked position, the latching portion 810 engages the retention feature 814 to inhibit motion of the movable portion 506.

Figure 9A:
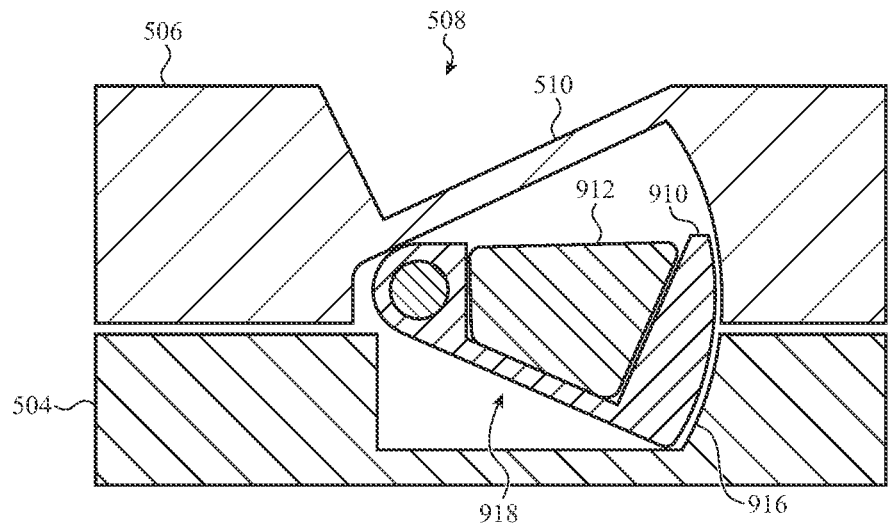
FIGS. 9A-9B depict partial cross-sectional views of an example computing component and accessory, illustrating another example latching mechanism.
Figure 9B:
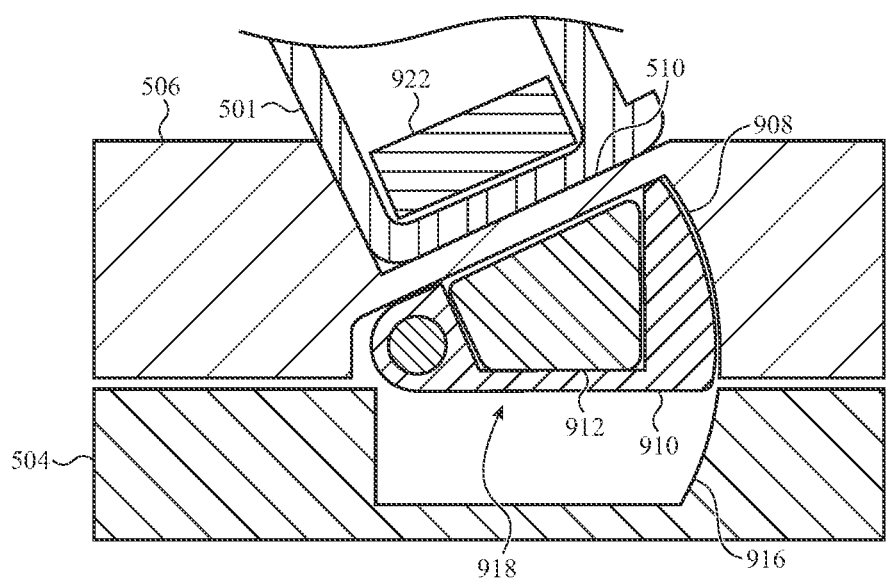

FIGS. 9A-9B illustrate another example latching mechanism that may be used in the computing system 500. In this example, a latching structure 918 with a magnet 912 may be moved between an engaged position (FIG. 9A) and a disengaged position (FIG. 9B). In the engaged position, the latching structure 918 may inhibit movement of the movable portion 506 relative to the stationary portion 504. For example, the latching structure 918 may be biased into an engaged position in which a latching portion 910 of the latching structure 918 overlaps or otherwise engages with a retention feature 916 (e.g., a wall, lip, flange, or other feature). The engagement between the latching portion 910 and the retention feature 916 inhibits motion of the movable portion 506.

The latching structure 918 may be biased into the engaged position (shown in FIG. 9A) via a spring, such as a torsion spring, coil spring, elastomer or polymer member, leaf spring, or the like. In some cases, the latching structure 918 may be biased into the engaged position via gravity (e.g., gravity causes the latching structure 918 to fall into the recess defined in the stationary portion 504). In some cases, the latching structure 918 may be biased into the engaged position via magnetic forces. For example, the magnet 912 may be magnetically attracted to an optional magnetic portion in the stationary portion 504. As another example, the latching structure 918 may be magnetically repelled by an optional magnet positioned in the movable portion 506, which repels the magnet 912 and thereby biases the latching structure 918 into the engaged position. Regardless of how the latching structure 918 is biased into the engaged position, the attraction force between the magnet 912 and the magnetic component 922 may be sufficient to overcome the biasing force and disengage the latching structure 918.

When the tablet computer 501 is positioned in the retention slot 508, the magnet 912 may be magnetically attracted to a magnetic component 922 in the tablet computer 501. The magnetic attraction between the magnet 912 and the magnetic component 922 overcomes the biasing force acting on the latching structure 918, such that the latching structure 918 is deflected or otherwise moved in order to disengage the latching portion 910 from the retention feature 916 (as shown in FIG. 9B). As shown in FIG. 9B, the latching structure 918 may be withdrawn into a cavity 908 in the movable portion 506. When the tablet computer 501 is removed from the retention slot 508, the biasing force acting on the latching structure 918 biases the latching structure 918 towards its engaged configuration. Thus, when the tablet computer 501 is removed from the retention slot 508 and the movable portion 506 is returned to its docked position, the latching portion 910 engages the retention feature 916 to inhibit motion of the movable portion 506.

While the example latching mechanisms are described with respect to a keyboard accessory for use with a tablet computer, this is merely one example in which the latching mechanisms may be used. For example, the latching mechanisms described with respect to FIGS. 5A-9B may be used to secure a stylus in a stowed position. As another example, the latching mechanisms may be used to secure a charging cable to a device, or to secure a lid of a notebook computer in a closed position. Other uses are also contemplated.

Figure 10:
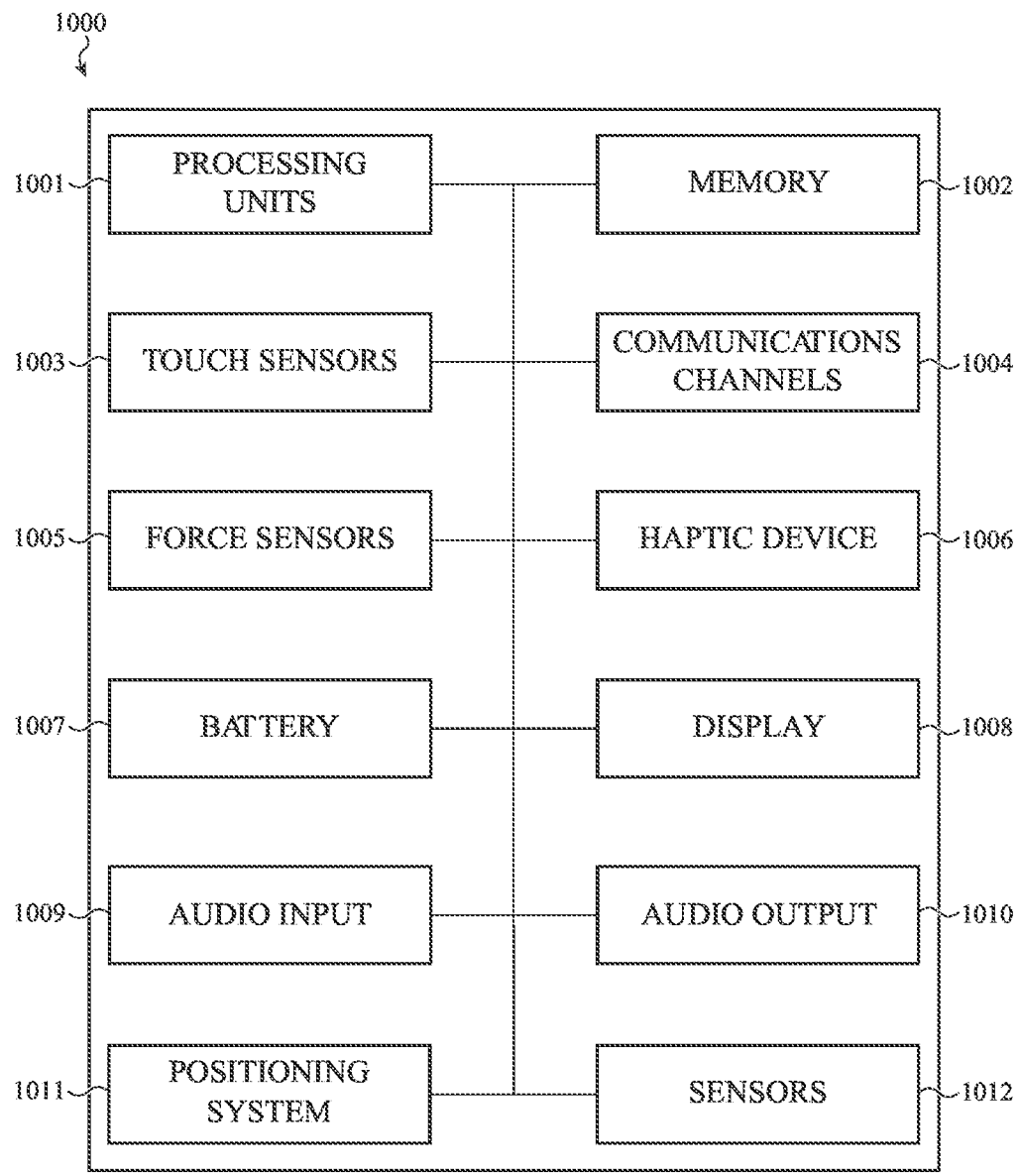
FIG. 10 depicts a schematic diagram of an example electronic device.

FIG. 10 depicts an example schematic diagram of an electronic device 1000. The electronic device 1000 may be an embodiment of or otherwise represent the device 100, the tablet computing component 501 (or any other device(s) described herein). The device 1000 includes one or more processing units 1001 that are configured to access a memory 1002 having instructions stored thereon. The instructions or computer programs may be configured to perform one or more of the operations or functions described with respect to the electronic devices described herein. For example, the instructions may be configured to control or coordinate the operation of one or more displays 1008, one or more touch sensors 1003, one or more force sensors 1005, one or more communication channels 1004, one or more audio input systems 1009, one or more audio output systems 1010, one or more positioning systems 1011, one or more sensors 1012, and/or one or more haptic feedback devices 1006.

The processing units 1001 of FIG. 10 may be implemented as any electronic device capable of processing, receiving, or transmitting data or instructions. For example, the processing units 1001 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The processing units 1001 may be coupled to a circuit board.

The memory 1002 can store electronic data that can be used by the device 1000. For example, a memory can store electrical data or content such as, for example, audio and video files, images, documents and applications, device settings and user preferences, programs, instructions, timing and control signals or data for the various modules, data structures or databases, and so on. The memory 1002 can be configured as any type of memory. By way of example only, the memory can be implemented as random access memory, read-only memory, Flash memory, removable memory, or other types of storage elements, or combinations of such devices.

The touch sensors 1003 may detect various types of touch-based inputs and generate signals or data that are able to be accessed using processor instructions. The touch sensors 1003 may use any suitable components and may rely on any suitable phenomena to detect physical inputs. For example, the touch sensors 1003 may be capacitive touch sensors, resistive touch sensors, acoustic wave sensors, or the like. The touch sensors 1003 may include any suitable components for detecting touch-based inputs (e.g., from a finger, stylus, or other touch-based input device) and generating signals or data that are able to be accessed using processor instructions, including electrodes (e.g., electrode layers), physical components (e.g., substrates, spacing layers, structural supports, compressible elements, etc.), processors, circuitry, firmware, and the like. The touch sensors 1003 may be integrated with or otherwise configured to detect touch inputs applied to any portion of the device 1000. For example, the touch sensors 1003 may be configured to detect touch inputs applied to any portion of the device 1000 that includes a display (and may be integrated with a display). The touch sensors 1003 may operate in conjunction with the force sensors 1005 to generate signals or data in response to touch inputs, and/or inputs from a stylus or other touch-based input device. A touch sensor or force sensor that is positioned over a display surface or otherwise integrated with a display may be referred to herein as a touch-sensitive display, force-sensitive display, or touchscreen.

The force sensors 1005 may detect various types of force-based inputs and generate signals or data that are able to be accessed using processor instructions. The force sensors 1005 may use any suitable components and may rely on any suitable phenomena to detect physical inputs. For example, the force sensors 1005 may be strain-based sensors, piezoelectric-based sensors, piezoresistive-based sensors, capacitive sensors, resistive sensors, or the like. The force sensors 1005 may include any suitable components for detecting force-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. The force sensors 1005 may be used in conjunction with various input mechanisms to detect various types of inputs. For example, the force sensors 1005 may be used to detect presses or other force inputs that satisfy a force threshold (which may represent a more forceful input than is typical for a standard "touch" input). Like the touch sensors 1003, the force sensors 1005 may be integrated with or otherwise configured to detect force inputs applied to any portion of the device 1000. For example, the force sensors 1005 may be configured to detect force inputs applied to any portion of the device 1000 that includes a display (and may be integrated with a display). The force sensors 1005 may operate in conjunction with the touch sensors 1003 to generate signals or data in response to touch- and/or force-based inputs.

The device 1000 may also include one or more haptic devices 1006. The haptic device 1006 may include one or more of a variety of haptic technologies such as, but not necessarily limited to, rotational haptic devices, linear actuators, piezoelectric devices, vibration elements, and so on. In general, the haptic device 1006 may be configured to provide punctuated and distinct feedback to a user of the device. More particularly, the haptic device 1006 may be adapted to produce a knock or tap sensation and/or a vibration sensation. Such haptic outputs may be provided in response to detection of touch and/or force inputs, and may be imparted to a user through the exterior surface of the device 1000 (e.g., via a glass or other surface that acts as a touch- and/or force-sensitive display or surface).

The one or more communication channels 1004 may include one or more wireless interface(s) that are adapted to provide communication between the processing unit(s) 1001 and an external device (including, for example a stylus, keyboard, or other input accessory). The one or more communication channels 1004 may include antennas, communications circuitry, firmware, software, or any other components or systems that facilitate wireless communications with other devices. In general, the one or more communication channels 1004 may be configured to transmit and receive data and/or signals that may be interpreted by instructions executed on the processing units 1001. In some cases, the external device is part of an external communication network that is configured to exchange data with wireless devices. Generally, the wireless interface may communicate via, without limitation, radio frequency, optical, acoustic, and/or magnetic signals and may be configured to operate over a wireless interface or protocol. Example wireless interfaces include radio frequency cellular interfaces (e.g., 2G, 3G, 4G, 4G long-term evolution (LTE), 5G, GSM, CDMA, or the like), fiber optic interfaces, acoustic interfaces, Bluetooth interfaces, infrared interfaces, USB interfaces, Wi-Fi interfaces, TCP/IP interfaces, network communications interfaces, or any conventional communication interfaces. The one or more communication channels 1004 may also include ultra-wideband (UWB) interfaces, which may include any appropriate communications circuitry, instructions, and number and position of suitable UWB antennas.

As shown in FIG. 10, the device 1000 may include a battery 1007 that is used to store and provide power to the other components of the device 1000. The battery 1007 may be a rechargeable power supply that is configured to provide power to the device 1000. The battery 1007 may be coupled to charging systems (e.g., wired and/or wireless charging systems) and/or other circuitry to control the electrical power provided to the battery 1007 and to control the electrical power provided from the battery 1007 to the device 1000.

The device 1000 may also include one or more displays 1008 configured to display graphical outputs. The displays 1008 may use any suitable display technology, including liquid crystal displays (LCD), organic light emitting diode (OLED) displays, active-matrix organic light-emitting diode displays (AMOLED), or the like. The displays 1008 may display graphical user interfaces, images, icons, or any other suitable graphical outputs. The display 1008 may correspond to the display 103.

The device 1000 may also provide audio input functionality via one or more audio input systems 1009. The audio input systems 1009 may include microphones, transducers, or other devices that capture sound for voice calls, video calls, audio recordings, video recordings, voice commands, and the like.

The device 1000 may also provide audio output functionality via one or more audio output systems (e.g., speakers) 1010. The audio output systems 1010 may produce sound from voice calls, video calls, streaming or local audio content, streaming or local video content, or the like.

The device 1000 may also include a positioning system 1011. The positioning system 1011 may be configured to determine the location of the device 1000. For example, the positioning system 1011 may include magnetometers, gyroscopes, accelerometers, optical sensors, cameras, global positioning system (GPS) receivers, inertial positioning systems, or the like. The positioning system 1011 may be used to determine spatial parameters of the device 1000, such as the location of the device 1000 (e.g., geographical coordinates of the device), measurements or estimates of physical movement of the device 1000, an orientation of the device 1000, or the like.

The device 1000 may also include one or more additional sensors 1012 to receive inputs (e.g., from a user or another computer, device, system, network, etc.) or to detect any suitable property or parameter of the device, the environment surrounding the device, people or things interacting with the device (or nearby the device), or the like. For example, a device may include temperature sensors, biometric sensors (e.g., fingerprint sensors, photoplethysmographs, blood-oxygen sensors, blood sugar sensors, or the like), eye-tracking sensors, retinal scanners, humidity sensors, buttons, switches, lid-closure sensors, or the like.

To the extent that multiple functionalities, operations, and structures described with reference to FIG. 10 are disclosed as being part of, incorporated into, or performed by the device 1000, it should be understood that various embodiments may omit any or all such described functionalities, operations, and structures. Thus, different embodiments of the device 1000 may have some, none, or all of the various capabilities, apparatuses, physical features, modes, and operating parameters discussed herein. Further, the systems included in the device 1000 are not exclusive, and the device 1000 may include alternative or additional systems, components, modules, programs, instructions, or the like, that may be necessary or useful to perform the functions described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above, below, over, under, left, or right (or other similar relative position terms), do not necessarily refer to an absolute position relative to an external reference, but instead refer to the relative position of components within the figure being referred to.

What is claimed is:

1. A tablet computing system comprising:
a display;
an enclosure enclosing the display and comprising:
 a cover positioned over the display and defining a front exterior surface of the enclosure; and
 a housing member coupled to the cover and defining:
  an exterior surface defining a stylus charging region and a stylus attachment region; and
  an interior surface opposite the exterior surface; and
a magnetic attachment mechanism positioned along the interior surface opposite the stylus attachment region and configured to releasably couple a stylus to the tablet computing system, the magnetic attachment mechanism comprising:
 a frame structure; and
 a magnet positioned in a recess of the frame structure and configured to:
  move from a rest position in the frame structure to an attachment position proximate the interior surface of the housing member in response to the stylus being positioned on the stylus attachment region of the exterior surface of the housing member; and
  move from the attachment position to the rest position in response to the stylus being removed from the stylus attachment region.

2. The tablet computing system of claim 1, wherein:
the magnetic attachment mechanism further comprises a magnetic return component configured to attract the magnet to the rest position; and
a magnetic attraction between the magnet and a magnetic component in the stylus when the magnet is in the rest position is greater than a magnetic attraction between the magnet and the magnetic return component when the magnet is in the rest position.

3. The tablet computing system of claim 1, wherein the magnet comprises an array of permanent magnets.

4. The tablet computing system of claim 1, wherein the magnet moves from the rest position to the attachment position due to magnetic attraction between the magnet and a magnetic component in the stylus.

5. The tablet computing system of claim 4, wherein the magnet moves from the attachment position to the rest position due to magnetic attraction between the magnet and a magnetic return component coupled to the frame structure.

6. The tablet computing system of claim 5, wherein:
the magnet comprises a first array of permanent magnets;
the magnetic component in the stylus is a second array of permanent magnets; and
the magnetic return component is a ferromagnetic material.

7. The tablet computing system of claim 1, wherein:
the exterior surface defines an additional stylus attachment region; and
the tablet computing system further comprises:
an additional magnetic attachment mechanism positioned along the interior surface opposite the additional stylus attachment region, the magnetic attachment mechanism comprising:
an additional frame structure; and
an additional magnet positioned in a recess of the additional frame structure and configured to:
move from an additional rest position in the additional frame structure to an additional attachment position proximate the interior surface of the housing member in response to the stylus being positioned on the additional stylus attachment region of the exterior surface of the housing member; and
move from the additional attachment position to the additional rest position in response to the stylus being removed from the additional stylus attachment region.

8. The tablet computing system of claim 7, wherein the stylus charging region is positioned between the stylus attachment region and the additional stylus attachment region.

9. A portable electronic device comprising:
an enclosure comprising:
a front cover defining a front exterior surface of the enclosure; and
a housing member coupled to the front cover and comprising a wall defining an exterior surface of the housing member;
a magnetic attachment mechanism positioned along an interior surface of the wall opposite the exterior surface and configured to magnetically retain a stylus to the exterior surface, the magnetic attachment mechanism comprising a movable magnet configured to be:
magnetically retained, via magnetic attraction to a magnetic component in the stylus, in an attachment position when the stylus is positioned on the exterior surface; and
magnetically retained in a rest position different from the attachment position when the stylus is removed from the exterior surface, wherein the rest position is a greater distance away from the interior surface of the housing member than the attachment position; and
a wireless charging system positioned along the interior surface of the housing member opposite the exterior surface and configured to wirelessly charge the stylus when the stylus is magnetically retained to the exterior surface.

10. The portable electronic device of claim 9, wherein:
the magnetic attachment mechanism comprises a frame structure defining a recess; and
the movable magnet is positioned in the recess and is configured to move within the recess.

11. The portable electronic device of claim 10, wherein:
the magnetic attachment mechanism comprises a magnetic return component coupled to the frame structure; and
the movable magnet is magnetically retained in the rest position due to magnetic attraction between the movable magnet and the magnetic return component.

12. The portable electronic device of claim 10, wherein the movable magnet is configured to slide along a surface of the recess when moving between the rest position and the attachment position.

13. The portable electronic device of claim 12, wherein the surface of the recess includes a coating.

14. The portable electronic device of claim 10, wherein a distance between the attachment position and the rest position is between about 0.25 mm and about 0.75 mm.

15. A portable electronic device comprising:
a display;
wireless communication circuitry;
a battery;
an enclosure enclosing the display, the wireless communication circuitry, and the battery, the enclosure defining, along an accessory attachment surface of an exterior surface of the enclosure:
an accessory charging region; and
an accessory attachment region;
a wireless charging system positioned along an interior surface of the enclosure opposite the accessory charging region and configured to wirelessly transfer power between the portable electronic device and an accessory attached to the exterior surface of the enclosure over the accessory charging region; and
a magnetic attachment mechanism positioned along the interior surface of the enclosure opposite the accessory attachment region and configured to attach the accessory to the accessory attachment surface, the magnetic attachment mechanism comprising:
a magnet; and
a magnetic return component, the magnet configured to:
move from a rest position to an attachment position proximate the interior surface of the enclosure due to magnetic attraction to a magnetic component in the accessory; and
return from the attachment position to the rest position due to magnetic attraction to the magnetic return component in response to the accessory being removed from the accessory attachment surface.

16. The portable electronic device of claim 15, wherein:
the enclosure comprises a wall defining the accessory attachment surface; and
the wall is between the accessory and the magnetic attachment mechanism when the accessory is attached to the accessory attachment surface.

17. The portable electronic device of claim 15, wherein:
the battery is a first battery;
the accessory is a removable charging accessory comprising a second battery; and
the wireless charging system is configured to charge the first battery with power from the second battery.

18. The portable electronic device of claim 15, wherein the magnet is a Halbach array including a plurality of permanent magnets.

19. The portable electronic device of claim 15, wherein:
the magnetic attachment mechanism comprises a frame structure defining a recess; and
the magnet is configured to slide within the recess between the rest position and the attachment position.

20. The portable electronic device of claim 19, wherein the accessory is a stylus.

\* \* \* \* \*